US012462720B1

(12) United States Patent
Al-Husseini

(10) Patent No.: US 12,462,720 B1
(45) Date of Patent: Nov. 4, 2025

(54) GRADUATION CAP WITH WIRELESSLY CONTROLLED COLD- CATHODE TUBE MATRIX DISPLAY

(71) Applicant: Mahdi Al-Husseini, Enterprise, AL (US)

(72) Inventor: Mahdi Al-Husseini, Enterprise, AL (US)

( * ) Notice: Subject to any disclaimer, the term of this patent is extended or adjusted under 35 U.S.C. 154(b) by 0 days.

(21) Appl. No.: 19/011,695

(22) Filed: Jan. 7, 2025

(51) Int. Cl.
*G09G 3/10* (2006.01)
*A42B 1/004* (2021.01)

(52) U.S. Cl.
CPC ............... *G09G 3/10* (2013.01); *A42B 1/004* (2013.01); *G09G 2370/06* (2013.01); *G09G 2370/16* (2013.01)

(58) Field of Classification Search
CPC .. G09G 3/10; G09G 2370/06; G09G 2370/16; A42B 1/004; G06F 1/163
See application file for complete search history.

(56) References Cited

U.S. PATENT DOCUMENTS

| | | | | | |
|---|---|---|---|---|---|
| 4,709,307 | A * | 11/1987 | Branom | A41D 27/085 362/108 |
| 5,912,653 | A * | 6/1999 | Fitch | G09G 3/3611 40/586 |
| 9,241,526 | B2 * | 1/2016 | Goldberg | A42B 1/248 |
| 9,489,016 | B2 * | 11/2016 | Malek | G06F 1/163 |
| 10,561,187 | B1 * | 2/2020 | Baccus | A42B 1/004 |
| D919,583 | S * | 5/2021 | Al-Husseini | D2/866 |
| D1,039,243 | S * | 8/2024 | Al-Husseini | D2/866 |
| 2007/0033705 | A1 * | 2/2007 | Dickson | A42B 1/02 2/175.6 |
| 2016/0085294 | A1 * | 3/2016 | Weiner | G06F 3/1415 345/173 |
| 2016/0142863 | A1 * | 5/2016 | Lam | H04W 4/029 455/41.2 |
| 2016/0148558 | A1 * | 5/2016 | Ernst | G06F 1/1694 345/520 |
| 2016/0174646 | A1 * | 6/2016 | Burns | A42B 1/004 2/171.01 |
| 2017/0049174 | A1 * | 2/2017 | Holcomb | A42B 1/004 |
| 2017/0262884 | A1 * | 9/2017 | Miller | A45C 15/00 |
| 2018/0000169 | A1 * | 1/2018 | Lee | G09F 9/30 |
| 2018/0241864 | A1 * | 8/2018 | Males | H04B 17/27 |
| 2018/0373293 | A1 * | 12/2018 | Staton | G09F 9/301 |

* cited by examiner

*Primary Examiner* — Rodney Amadiz

(57) ABSTRACT

Provided are systems and methods for a graduation cap with a wirelessly controlled cold-cathode tube matrix display capable of displaying text and complex pictorial representations. The graduation cap is comprised of a series of interconnected modules atop a circuit-board base plate affixed to the upper surface of a mortarboard or similar. A remote computing device transmits control signals via a text submission or pictorial representation program over a network to a communications module. The processing module processes the received signals to drive a cold-cathode tube matrix display. The processing module is further supported by an animation program and memory module. Also discussed are a swappable battery, power module, and high-voltage power supply module to support the requisite electronics. This invention enables an interactive and mobile approach to vintage alphanumeric cold-cathode display tubes to celebrate graduating students.

20 Claims, 12 Drawing Sheets

1000

1200

GRADUATION CAP WITH WIRELESSLY CONTROLLED COLD- CATHODE TUBE MATRIX DISPLAY

BACKGROUND

1. Technical Field

This invention introduces systems and methods for a graduation cap with a wirelessly controlled cold-cathode tube matrix display. Specifically, the invention pertains to the transmission of control signals from a remote computing device to and across a series of modules on the graduation cap to facilitate the display of text and pictorial representations.

2. Background Art

The following is a tabulation of some prior art that presently appears relevant:

Patents and Applications

| Number | Kind Code | Issue/ Publication Date | Inventor |
|---|---|---|---|
| USD 764,771 | S | May 2, 2017 | Miller et al. |
| CN 208463041 | U | Feb. 5, 2019 | — |
| WO 2015,172,988 | A1 | Jun. 18, 2015 | Lai et al. |
| U.S. Pat. No. 10,990,185 | B2 | Apr. 27, 2021 | Dierk et al. |
| U.S. Pat. No. 10,561,187 | B1 | Feb. 18, 2020 | Baccus |
| USD 1,039,243 | S | Aug. 20, 2024 | Al-Husseini |
| USD 942,534 | S | Feb. 1, 2022 | Al-Husseini |
| USD 919,583 | S | May 18, 2021 | Al-Husseini |

3. Background

Cold cathode display tubes, colloquially known as nixie tubes, are electronics devices for displaying numeric, alphanumeric, or symbolic information using glow discharge around internal wire-meshes. With very few exceptions, nearly all nixie tubes were manufactured between 1950 and 1990. Regular consumer use of nixie tubes ended with advent of light emitting diodes, which proved significantly more cost-effective in production and have lower voltage requirements. Yet, despite their costly nature and high-voltage requirement for operation, nixie tubes continue to be used by vintage electronic enthusiasts for their unique design and reliable construction. New and interesting nixies displays, whether clocks, calculators, or game boards, continue to proliferate in the vintage electronics community.

Despite their appeal and resurgence in the vintage electronics community, nixie tubes are rarely employed for mobile applications—that is, any application which would require a small form factor and the ability to be readily transported—two things that nixie tubes are decidedly not. Nixie tube strike voltage varies with the brand and tube type but is typically around 180V. These are low current devices, but the power draw is nonetheless substantial. For that reason, few applications have been developed for nixies intended to be operated on battery power. Similarly, the high-voltage required for glow discharge necessitates the use of a high-voltage power module to convert from the much lower voltages supplied by traditional battery packs. These converters can take up significant space if not designed to the necessary specifications. The tubes themselves are typically large in size due to their physical construction-layers of wire mesh atop one another confined to a glass tube. When combined with the necessary processing chips: antennas, transistors, resistors, capacitors, switches, and other necessary electronic components for operation, the resulting circuit board may be large and/or multi-layered. Finally, given the high-voltage requirements, certain protection must be provided from the elements, be that weather, accidental spills, etc.

Due to the various challenges discussed above, designing a wearable graduation cap adorned with a matrix of remotely controlled high-voltage nixie tubes displaying text and pictorial representations is difficult, and necessitates developing an optimized and application-specific circuit-board with interconnected modules. Additionally, the display of pictorial representations on the mortarboard, in addition to simply numbers and text, requires a grid tube array of tubes and the generation of instructions across multiple tubes simultaneously, assisted by a custom pictorial representation program. To enable meaningful pictorial representations, the matrix array needs to comprise a significant quantity of tubes-further exacerbating the mobility, circuit-board surface area, and power issues previously mentioned. Overcoming these concerns while maintaining functionality culminates in a graduation cap that integrates vintage technologies and modern electronics alike in a novel manner, befitting a celebration akin to, for example, this pro se inventor's upcoming PhD ceremony.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
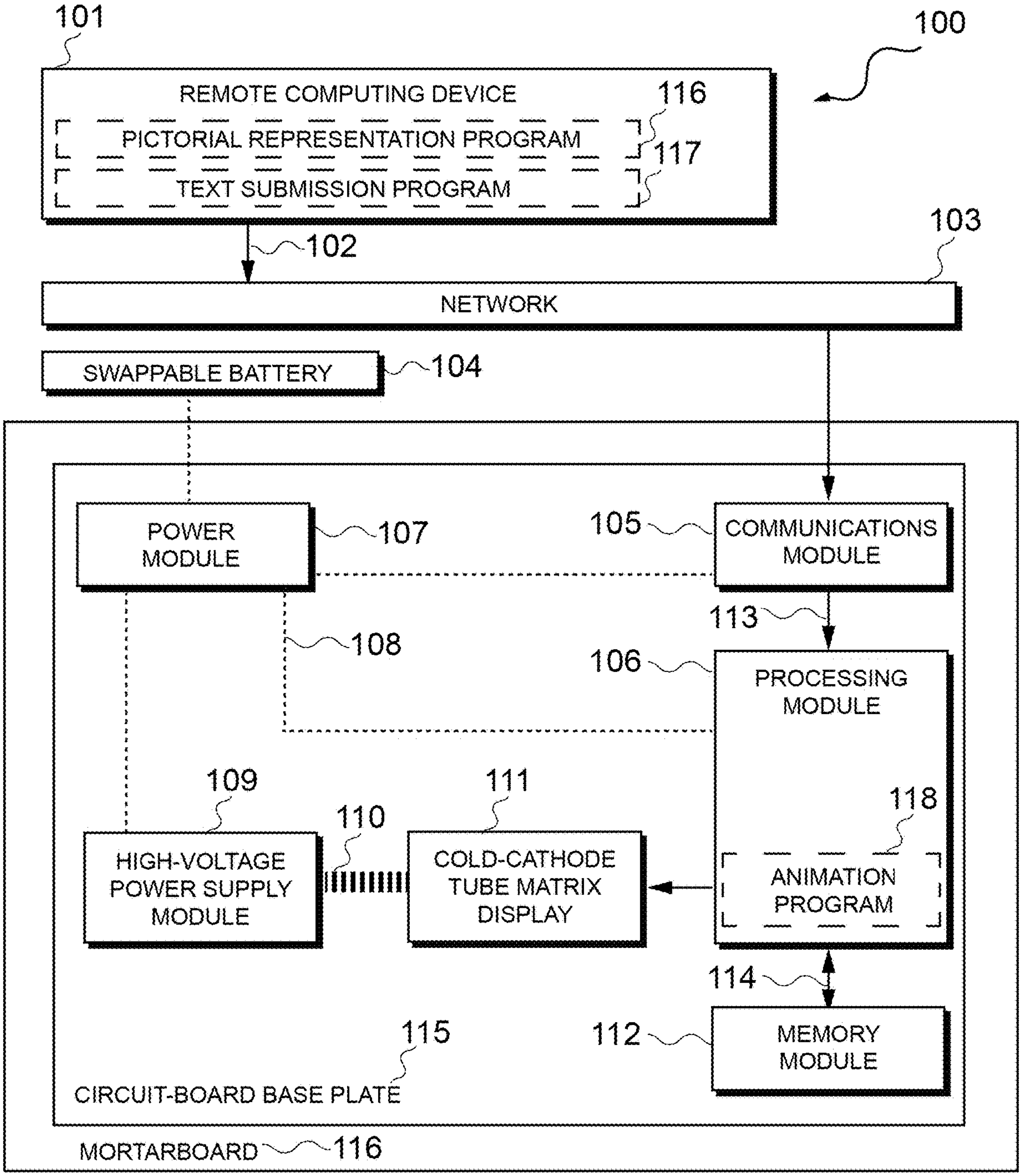
FIG. 1 depicts a block diagram illustrating the overall system architecture.

The intelligent integration of command-and-control and medical air transport simulators in a networked system enables real-time collaboration between medical planners and medical aviators and supports enhance learning objectives in military medical evacuation. The present invention takes advantage of advances in networked systems, reinforcement learning, and probabilistic modeling. Embodiments of the present invention discussed in the detailed description and shown in the drawings are not intended to restrict the scope of identification and authentication applications, but rather, to illuminate the underpinnings and advantages brought about through variations on the proposed invention. Additional embodiments may be possible.

The figures will now be discussed in-depth to describe the present invention. FIG. 1 illustrates in 0100 a block diagram illustrating the overall system architecture. Control signals 102 are generated by the user using remote computing device 101, which may be a laptop, desktop, mobile device, or similar. Loaded onto computing device 101 are pictorial representation program 116 and text submission program 117. Programs 116 and 117 may be, for example, stored within a hosted page on the World Wide Web or within a downloaded mobile application. Pictorial representation program 116 provides an interface for the user to select preloaded pictorial representations (e.g. a tree, snowflake, smiley face, etc.) or develop their own, segment by segment. Text submission program 117 provides an interface for the user to enter custom text strings, to include letters, numbers, and symbols, to be displayed. Programs 116 and 117 both provide the user options for selecting animations such as scrolling, splitting, and flying in, which are then keyed in and processed by animation program 118 in processing module 106. Programs 116 and 117 may also provide the user a feature to select the cold-cathode tube matrix display being issued control signals, if there is more than one display available. The resulting control signals 102 are, in one embodiment of the invention, high-level, abstract instructions to be broken into segment-by-segment instructions by programming module 106.

Network 103 may be any form of wireless network to include wireless local area network, wireless personal area network, wireless wide area network, or wireless metropolitan area network, supported by interfaces to include, for example, Wi-Fi, Bluetooth, radio, and cellular networks. Control signals 102 are transmitted over network 103 to arrive at communications module 105. Communications model 105 is responsible for receiving control signals 102 over network 103 and sending the signals to processing module 106. Processing module 106 receives the high-level, abstract instructions within the control signal and transforms them into low-level, tube-specific, segment-by-segment instructions after considering user-driven requirements for animation per animation program 118. More specifically, animation program 118 modifies the low-level, tube-specific, segment-by-segment instructions with successive time-steps. An example of instructions generated for the scrolling animation is provided in FIG. 9. Processing module 106 may choose to store a version of the high-level or low-level instructions 114 within memory module 112 for future referencing.

Power management is a critical consideration in the design of the proposed invention, and that begins with swappable battery 104. Swappable battery 104 may be designed to support any voltage or current in accordance the power input requirements of high-voltage power supply module 109 and cold-cathode tube matrix display 111. Swappable battery 104 may have a receptacle designed to support any given connector, barrel jack for example, to connect to an elongated cable for transferring power to power module 107. The elongated cable can range in length, and in one embodiment may be around thirty-six inches to permit the wearer of the graduation cap to place the swappable battery discretely in a pants pocket. This minimizes the weight of the graduation cap on the wearer's head, which in turn minimizes neck and shoulder muscle fatigue. Once electrical power arrives at power module 107, it may be stabilized using a voltage regulator or similar to support the various electronic components inside communications module 105, processing module 106, memory module 112, and high-voltage power supply module 109 via low-voltage power bus 108. A switch, whether rocker, push-button, or otherwise, may be placed between the power module 107 and swappable battery 104 to enable the wearer to easily power on or off the graduation cap at will. One or more high-voltage power buses 110 is powered by one or more high-voltage power supply modules 109. Multiple high-voltage power supply modules and buses may be required depending on the number of cold-cathode display tubes to be supported.

All modules are arranged on a circuit-board base plate 115, which is affixed to the top surface of mortarboard 116 using magnets, hook-and-loop fasteners, or other mechanisms for attaching and detaching two surfaces with ease. The circuit-board base plate 115 may be shaped to fit within the edges of mortarboard 116 and may have any kind of base material to include Fr-4 PCB, aluminum PCB, flex PCB, or copper core PCB. Circuit-board base plate 115 may possess multiple layers, have any thickness, have any color, and have any surface finish to include HASL, immersion gold, and OSP. Mortarboard 116 may be a traditional four-sided rigid mortarboard, a soft eight-sided tam, or any headgear affiliated with graduation ceremony regalia. Cold-cathode tube matrix display 111 may be comprised of any number of alphanumeric cold-cathode display tubes arranged in a grid configuration. Cold-cathode display tubes especially suitable for the proposed invention include Telefunken ZM1350s and Burroughs 5971*s*, both of which are alphanumeric and therefore permit the strategic illumination of disparate segments to form complex pictorial representations as may be requested through pictorial representation program 116.

Figure 2:
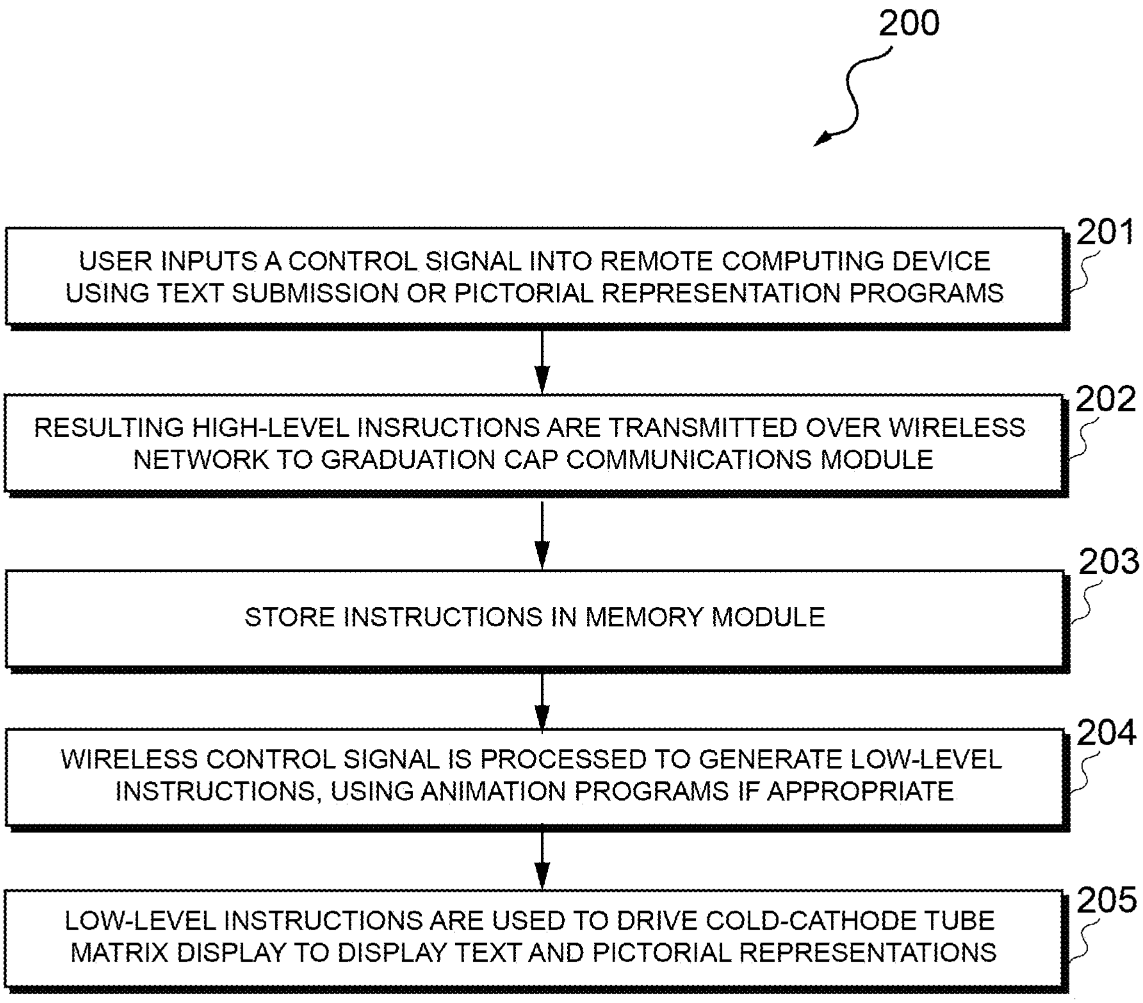
FIG. 2 depicts a flowchart showing how control signals are transmitted, processed, and visualized.

FIG. 2 illustrates in 0200 a flowchart showing how control signals are transmitted, processed, and visualized. In step 201, the user inputs an initial control signal into remote computing device 101 using pictorial representation program 116 or text submission program 117. The user may be the graduate wearing the graduation cap, family or friends of the graduate in the audience during the graduation ceremony, or anyone who is provided access to programs 116 and 117. In step 202, the resulting high-level instructions from programs 116 and 117 are transmitted over wireless network 103 to graduation cap communications module 105. In step 203, the received high-level instructions are stored in memory module 112. Alternatively, the low-level instructions generated by processing module 106 in step 204, or a modified version 114 thereof, may be stored in memory module 112. Step 204 further involves the used of animation program 118 to segment the low-level instructions by time-step to various subsets of cold-cathode tube matrix display 111 to generate animations, such as a scrolling effect. In step 205, the low-level instructions are used to drive the cold-cathode tube matrix display 111 to display text and pictorial representations as requested by the user.

Figure 3A:
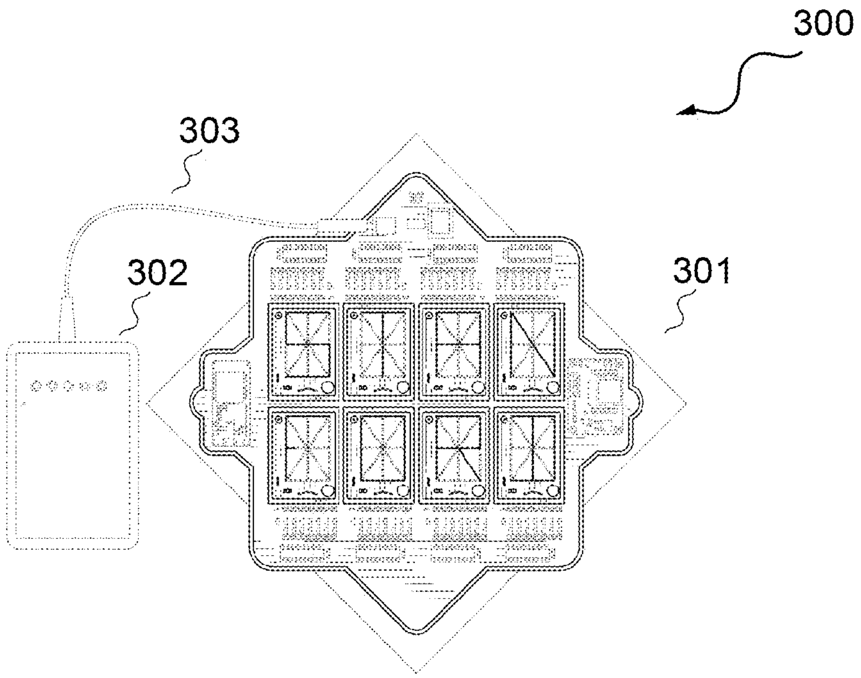
FIG. 3*a* depicts one embodiment of the proposed invention on a mortarboard.
Figure 3B:
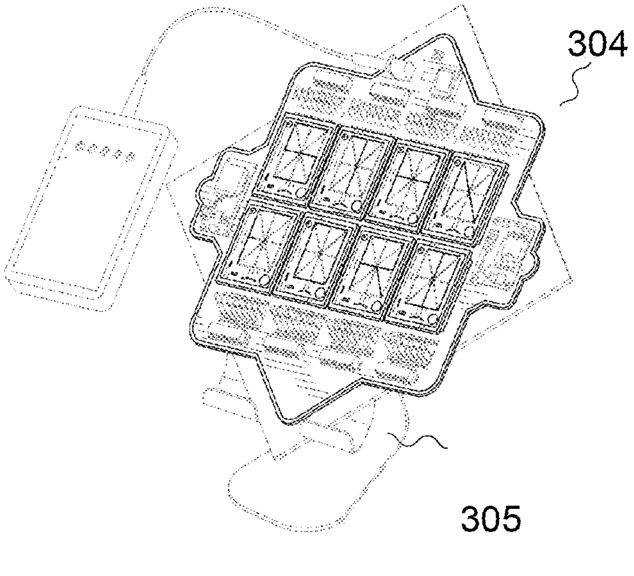
FIG. 3*b* depicts one embodiment of the proposed invention on a mortarboard.

FIG. 3*a* illustrates in 0300 an embodiment of the proposed invention on a four-sided mortarboard with eight Telefunken ZM1350 tubes arranges in a 2×4 grid configuration. FIG. 3*a* shows a top profile view of the embodiment of the proposed invention, where 301 is the circuit-board base plate atop the mortarboard, 303 is the elongated cable connecting the swappable battery and graduation cap power module, and 302 is a representation of swappable battery 104. FIG. 3*b* shows a perspective view of the embodiment of the proposed invention 304, on an optional graduation cap stand 305. As shown in both 301 and 305, the transistors, resistors, and driving chip for each tube is arrayed above or below it to maximize circuit-board surface area. Similarly, the micro-controller and high-voltage power supply module are arrayed on the left and right side of the circuit-board and matrix display, respectively. More generally, individual electronic components for the various interconnected modules may be arrayed in whatever manner best optimizes the limited surface area of the top side of circuit-board base plate 115. The daisy chaining of shift registers and inclusion of tube-specific driving chips may further minimize the surface area required for cold-cathode tube matrix display operation.

Figure 4:
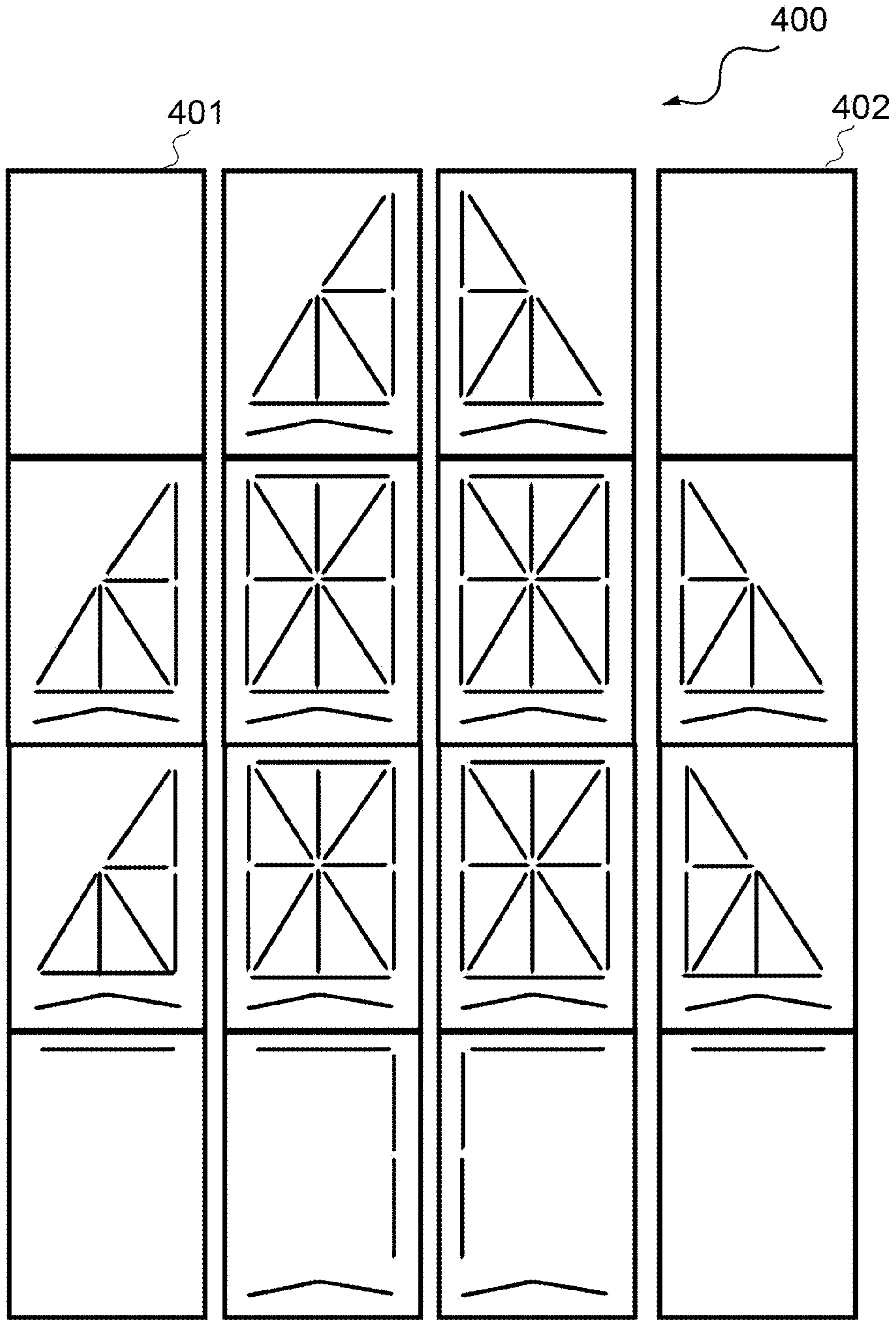
FIG. 4 depicts an example of a complex pictorial representation that may be displayed on one embodiment of the proposed invention that uses Telefunken ZM1350 cold-cathode display tubes.

FIG. 4 illustrates in 0400 an example of a complex pictorial representation that may be displayed on one embodiment of the proposed invention that uses Telefunken ZM1350 cold-cathode display tubes arrayed in a 4×4 grid configuration. Illustration 0400 shows how illuminating specific segments across various alphanumeric tubes forms a clearly visible tree, hereafter referred to as "the Stanford tree". Note that not all tubes must be partially or fully illuminated. Top left tube 401 and top right tube 402 remain unlit when displaying the Stanford tree.

Figure 5:
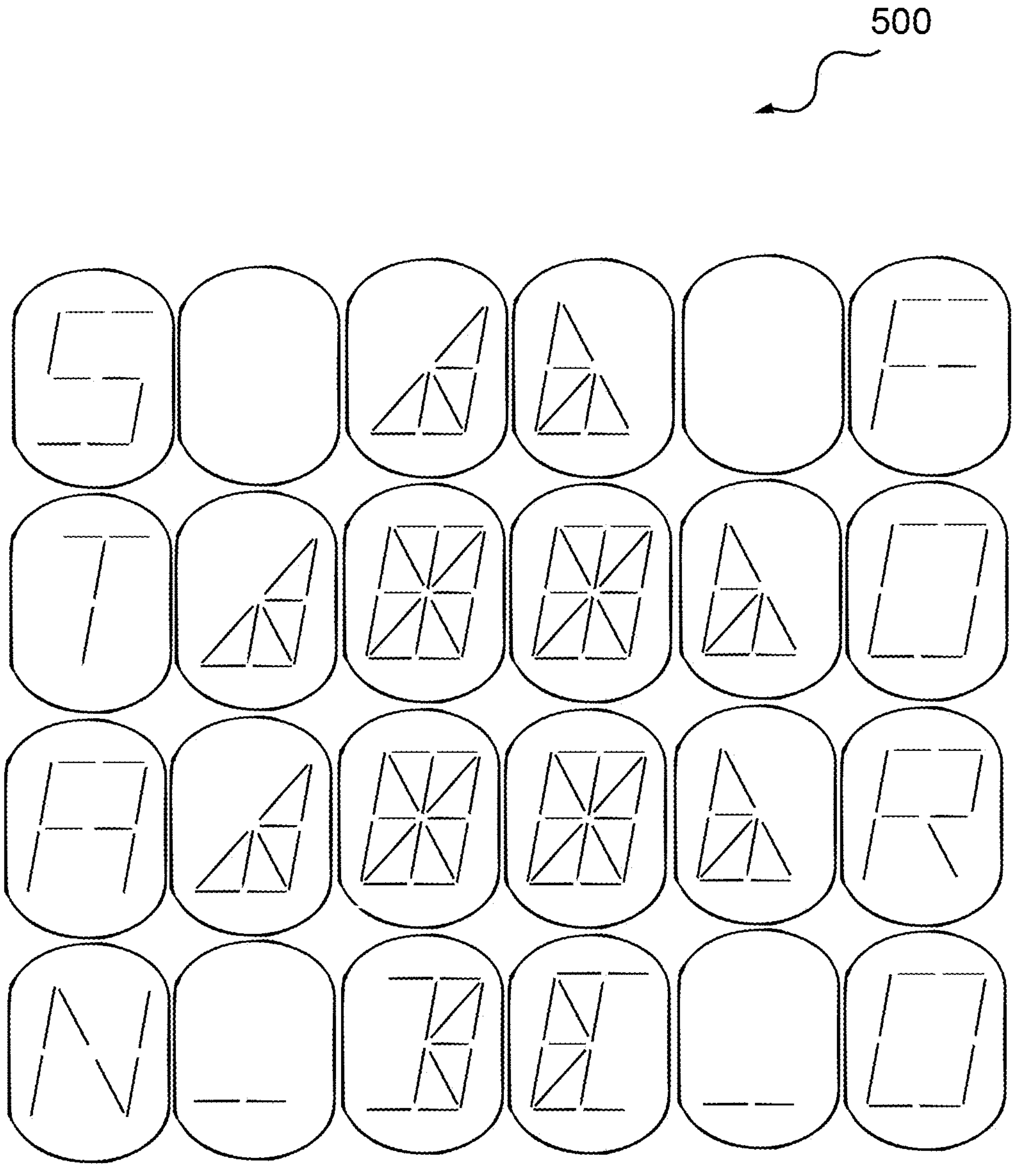
FIG. 5 depicts an example of a complex pictorial representation that may be displayed on one embodiment of the proposed invention that uses Burroughs 5971 cold-cathode display tubes.

FIG. 5 illustrates in 0500 an example of a complex pictorial representation that may be displayed on one embodiment of the proposed invention that uses Burroughs 5971 cold-cathode display tubes arrayed in a 4×6 grid configuration. The Stanford tree is again shown, now with the text string "STAN" on the left hand-side and the text string "FORD" on the right hand-side. Illustration 0500 shows how cold-cathode tube matrix display 111 can simultaneously display text and pictorial representations.

Figure 6:
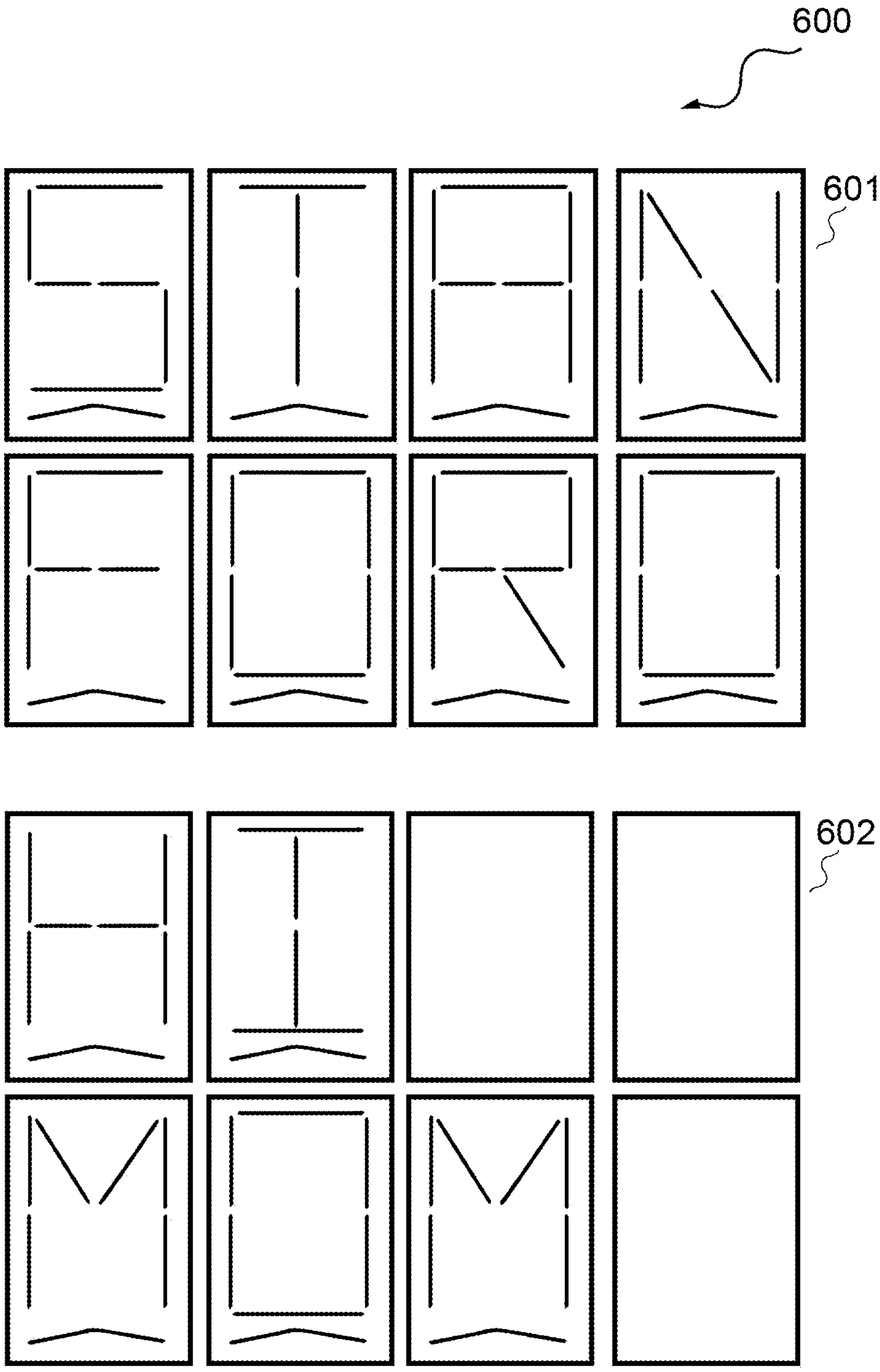
FIG. 6 depicts an example text that may be displayed on one embodiment of the proposed invention that uses Telefunken ZM1350 cold-cathode display tubes.

FIG. 6 illustrates in 0600 an example text that may be displayed on one embodiment of the proposed invention that uses Telefunken ZM1350 cold-cathode display tubes arrayed in a 2×4 grid configuration. In 601, the text "STANFORD" is displayed by visualizing the first half of the text on the upper-half of the display and the second half of the text on the lower-half of the display. This division permits words with five to eight letters to be shown in full on a 2×4 grid configuration. In 602, the text "HI MOM" is displayed by visualizing the first word on the upper-half of the display and the second word on the lower-half of the display. This division permits phrases and sentences to be distributed across the graduation cap in space and time.

Figure 7:
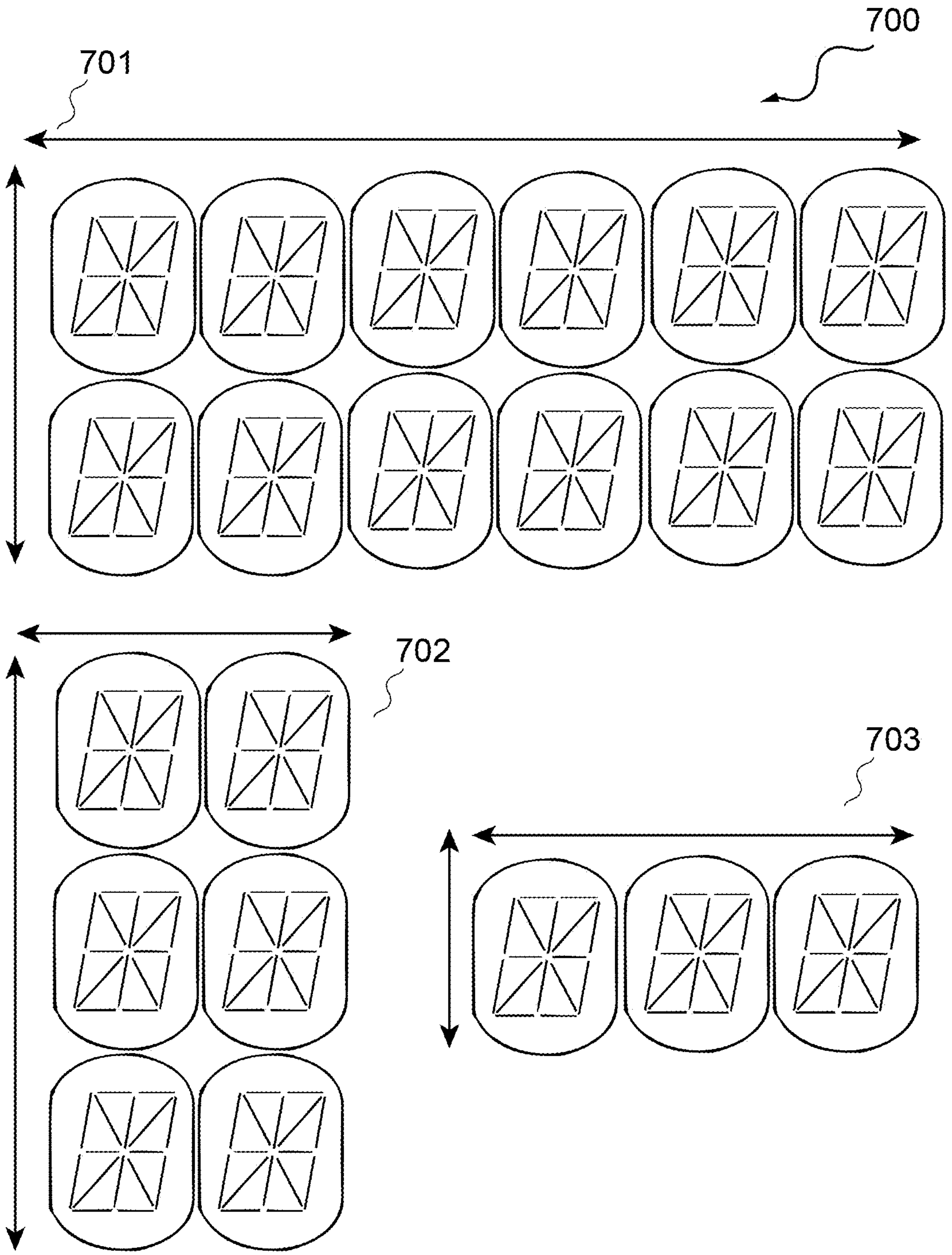
FIG. 7 depicts various grid configurations of two or more Burroughs 5971 cold-cathode display tubes.

FIG. 7 illustrates in 0700 various grid configurations of two or more Burroughs 5971 cold-cathode display tubes. The primary limitation with display tube grid configurations is 1.) surface area on the circuit-board for not only the tubes but the requisite supporting infrastructure, 2.) load limitations for the high-voltage power transfer module, and 3.) the resultant power load and limitations in swappable battery capacity. Three configurations are shown: 701 depicts a 2×6 grid configuration, 702 depicts a 3×2 grid configuration, and 703 depicts a 1×3 grid configuration.

Figure 8:
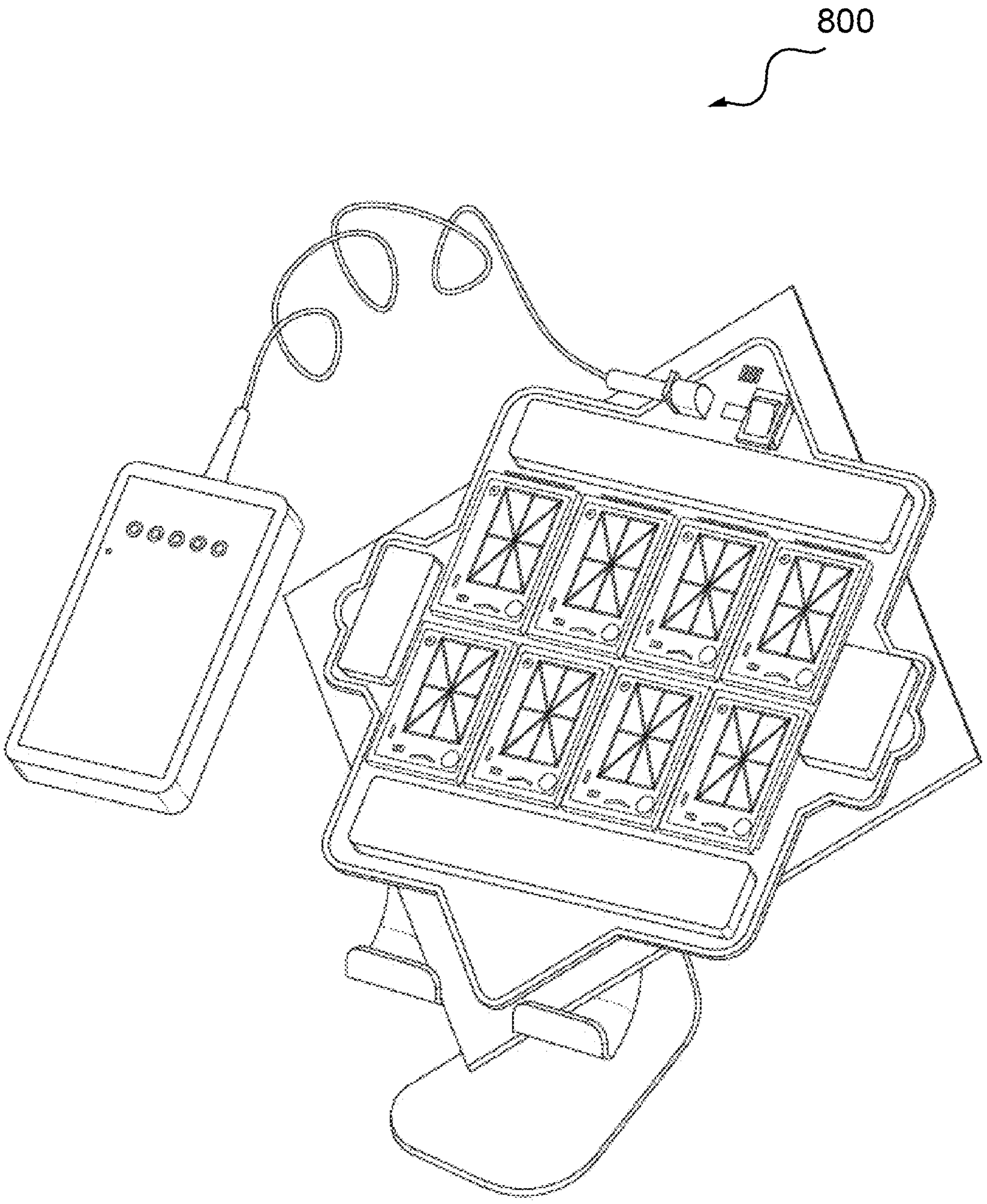
FIG. 8 depicts one embodiment of a protective layer positioned over the circuit-board base plate.

FIG. 8 illustrates in 0800 one embodiment of a protective layer positioned over portions of circuit-board base plate 115. Without the protective layer, the electronic components that make up interconnected modules 107, 105, 109, 106, and 112 are subject to environmental effects such as adverse weather or spills. While many graduation ceremonies are indoors, others are held in outdoor settings, where adverse weather like rain may be experienced. To avoid such complications, an enclosure, whose material may be plastic, metal, or any other material, is selectively placed over the various electrical components on circuit-board base plate 115. The enclosure may be partitioned into separate sections depending on the overall design of the graduation cap and the layout of the individual modules. A safety feature of the enclosure is that it prevents bystanders from touching the circuit-board base plate, and thereby minimizes the electrical shock hazard, given the high-voltage components present between high-voltage power supply module 109, high-voltage bus 110, and cold-cathode tube matrix display 111.

Figure 9:
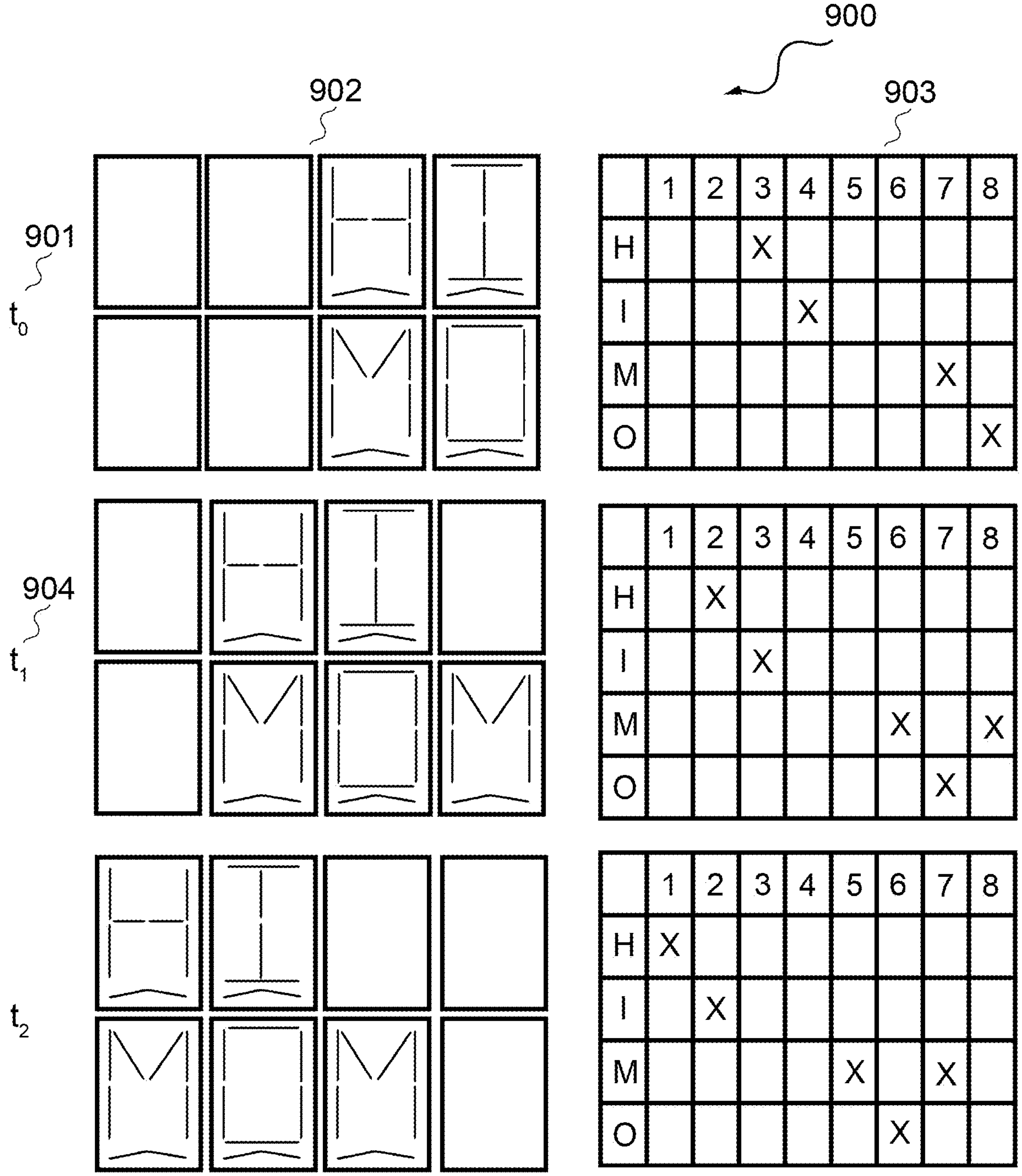
FIG. 9 depicts the processing module generating instructions to sequentially drive subsets of the cold-cathode matrix display to generate animations.

FIG. 9 illustrates in 0900 the processing module generating instructions to sequentially drive subsets of the cold-cathode matrix display to generate animations. Time-step 901 indicates time to, for a left-scrolling animation. Display during time-step $t_1$ 902 displays the first two characters of the words "HI" and "MOM" on the upper and lower-halves of the display, respectively. Reference table 903 visualizes the high-level instructions received from the processing module 106 at to. Time-step 904 indicates the subsequent time-step at $t_1$. The display and reference table are adjusted with each subsequent time-step to facilitate the selected animation. The duration between time-steps can be adjusted in programs 116 and 117, to enable, for example, a slow, moderate, or fast scrolling animation.

Figure 10:
FIG. 10 depicts a student in doctoral graduation regalia donning a doctoral tam with a wirelessly controlled illuminated cold-cathode tube matrix display.

FIG. 10 illustrates in 1000 a student in doctoral graduation regalia donning a doctoral tam with a wirelessly controlled illuminated cold-cathode tube matrix display using Burroughs 5971 tubes in a 4×4 grid configuration.

Figure 11:
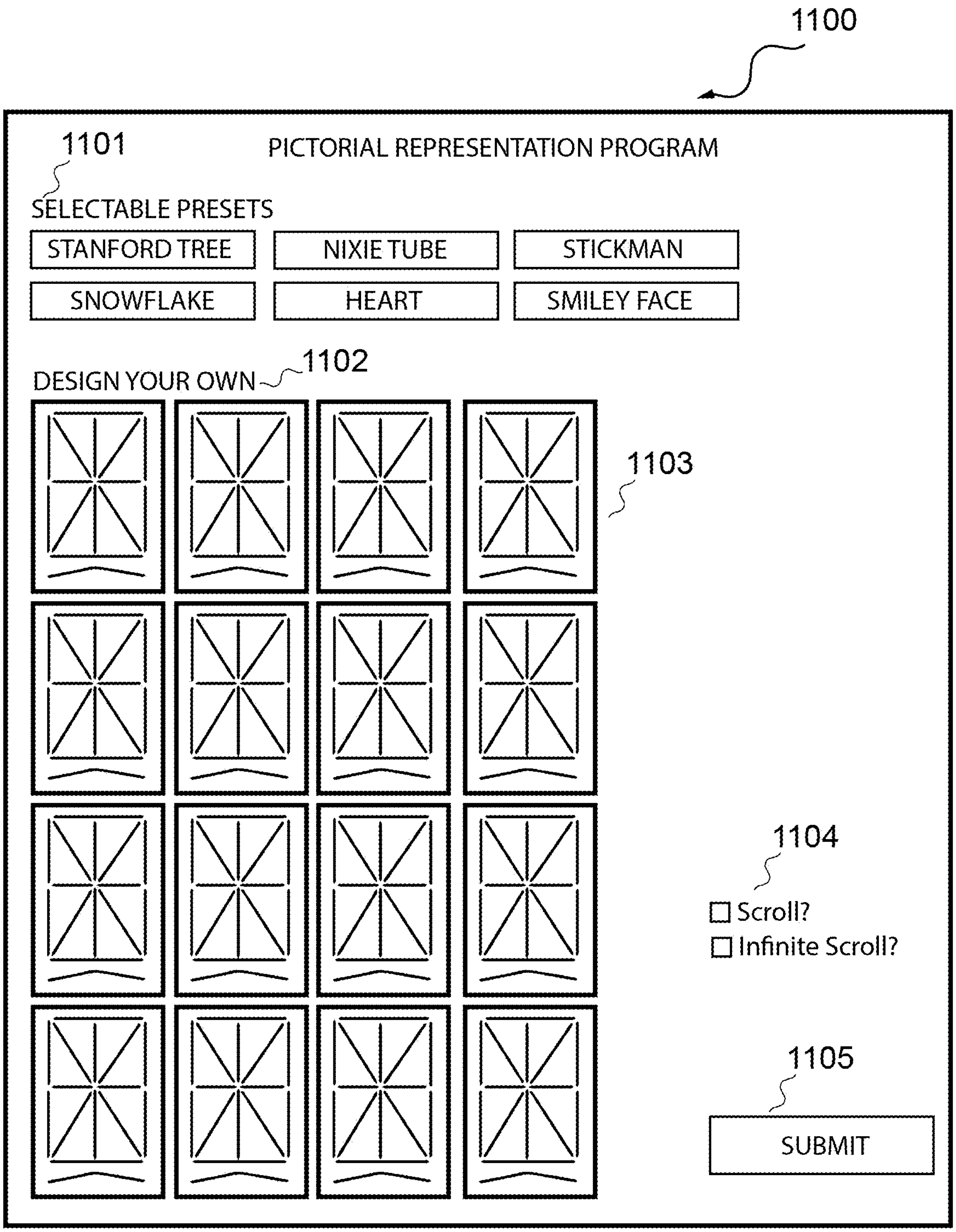
FIG. 11 depicts a pictorial representation program interface where users can input control signals to be converted into high-level instructions for displaying pictorial representations on the cold-cathode tube matrix display.

FIG. 11 illustrates in 1100 a pictorial representation program interface where users can input control signals to be converted into high-level instructions for displaying pictorial representations. Selectable presets 1101 provide users the ability to select existing pictorial representations stored in the program memory; those may include, for example, the Stanford tree, a snowflake, a nixie tube, a heart, a stickman, and a smiley face. Selecting a preset causes it to illuminate on grid representation 1103, enabling the user to see what the preset looks like on a representative cold-cathode tube matrix display prior to high-level instruction transmission triggered by submit button 1105. The user may alternatively choose to design their own pictorial representation in section 102 by interfacing directly with grid representation 1103. The user selects individual segments to illuminate, or darken, them, and thus is able to build-out their own pictorial representation. Animation options 1104 provide users the option to toggle specific animations and their durations, and trigger animation program 118 in processing module 106. Once a preset or custom pictorial representation is selected or developed, the user selects submit button 1105, which triggers the transmission of high-level instructions 102 over network 103 to communications module 105, to be processed graduation cap-side.

Figure 12:
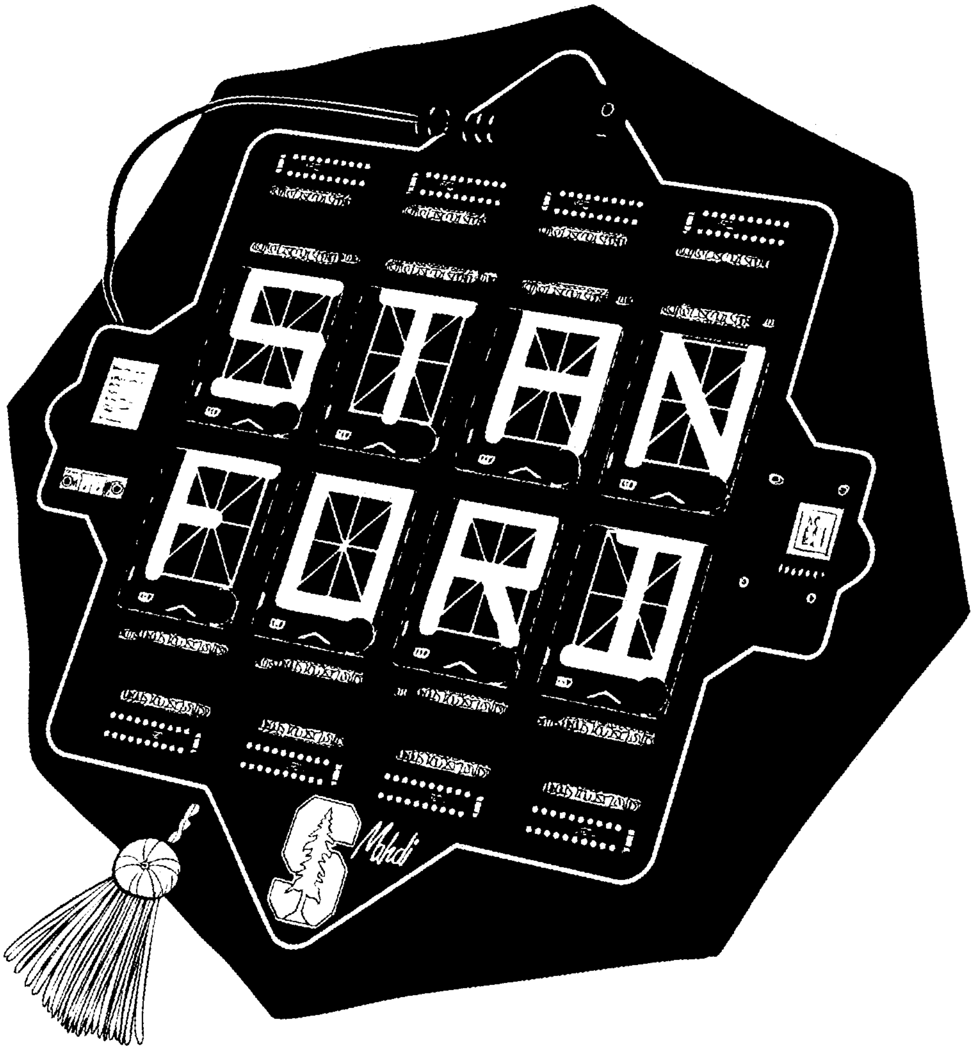
FIG. 12 depicts one embodiment of the proposed invention on a doctoral tam.

FIG. 12 illustrates in 1200 one embodiment of the proposed invention on a doctoral tam.

What is claimed is:

1. A graduation cap with a wirelessly controlled cold-cathode tube matrix display for displaying text and pictorial representations, the graduation cap comprising:

a mortarboard; and a remote computing device; and two or more alphanumeric cold-cathode tubes arranged in a matrix display, the matrix display configured to display text and pictorial representations; and a high-voltage power supply module to provide power to the cold-cathode tube matrix display; and a communications module configured to receive wireless control signals from the remote computing device; and a processing module configured to process control signals from the communications module to generate instructions to drive the cold-cathode tube matrix display to display text and pictorial representations; and a memory module configured to store received wireless control signals; and a battery module to supply electrical power to the high-voltage power supply module, the communications module, the processing module, and the memory module; and a circuit-board base plate affixed to the upper surface of the mortarboard, embedded in which are the electrical components enabling the cold-cathode tube matrix display, the high-voltage power supply module, the communications module, the processing module, the memory module, and the battery module.

2. The graduation cap of claim 1, wherein the communications module operates using a wireless communication interface over a network selected from the group consisting of Bluetooth, Wi-Fi, infrared, NFC, RFID, and radio.

3. The graduation cap of claim 1, wherein the processing module is configured to execute a software program for dynamically updating the content displayed on the cold-cathode tube matrix display based on the received control signals from the remote computing device.

4. The graduation cap of claim 1, further comprising a protective layer positioned over the circuit-board base plate, the protective layer configured to shield the electronic components from physical damage while allowing visibility of the cold-cathode tube matrix display.

5. The graduation cap of claim 1, wherein the alphanumeric cold-cathode tubes are arranged in a grid configuration with individual addressability of each segment of each tube via the processing module.

6. The graduation cap of claim 1, wherein the high-voltage power supply module includes a voltage regulator configured to adapt to the varying power demands of the cold-cathode tube matrix display.

7. The graduation cap of claim 1, wherein the remote computing device executes a pictorial representation program that stores predefined display patterns for use during a graduation ceremony.

8. The graduation cap of claim 1, wherein the circuit-board base plate is affixed to the upper surface of the mortarboard using magnets or similarly detachable materials, which permits ease of separation of the base plate from the mortarboard, and therefore the seamless replacement or upgrade of modules on the mortarboard.

9. The graduation cap of claim 1, wherein the battery module includes a swappable battery, a charging port for recharging the battery, and a voltage regulator to create a stable electrical input to the modules on the mortarboard.

10. The swappable battery of claim 9, wherein the swappable battery is electrically connected to the remainder of the battery module by an elongated cable to permit the swappable battery to be placed in the pants pocket of an individual donning the graduation cap.

11. The swappable battery of claim 9, wherein the swappable battery may be rechargeable to enable sustained use.

12. The graduation cap of claim 1, wherein the processing module can enable the display of animations on the graduation cap by generating instructions that sequentially drive subsets of the cold-cathode tube matrix display in a predefined order.

13. The graduation cap of claim 1, wherein the mortarboard may be a four-sided mortarboard, an eight-sided doctoral tam, or other headgear affiliated with graduation ceremony regalia.

14. A method for displaying text and pictorial representations on a graduation cap with a wirelessly controlled cold-cathode tube matrix display, the method, comprising:

receiving a wireless control signal at a communications module from a remote computing device; and storing the wireless control signal in a memory module; and processing the wireless control signal to generate instructions to drive the cold-cathode tube matrix display and display text and pictorial representations using the processing module; and driving the cold-cathode tube matrix display to display text and pictorial representations on the graduation cap.

15. The method of claim 14, wherein receiving a wireless control signal involves a wireless communication interface over a network selected from the group consisting of Bluetooth, Wi-Fi, infrared, NFC, RFID, and radio.

16. The method of claim 14, wherein processing the wireless control signal to generate instructions to drive the cold-cathode tube matrix display involves a software program for dynamically updating the content displayed on the cold-cathode tube matrix display based on the received control signals.

17. The method of claim 14, wherein storing the wireless control signal in memory enables the graduation cap to repeatedly display text and pictorial representations at a regular timescale and when no wireless control signal is received from the remote computing device.

18. The method of claim 14, wherein the cold-cathode tube matrix display comprises two or more alphanumeric cold-cathode tubes arranged in a grid configuration to enable the display of pictorial representations or text requiring illuminated segments across multiple adjacent tubes.

19. The method of claim 14, further comprising displaying animations by sequentially activating subsets of the cold-cathode tube matrix display in a predefined order.

20. The method of claim 14, further comprising powering the graduation cap using a swappable battery with an elongated cable to permit the swappable battery to be placed in the pants pocket of an individual donning the graduation cap.

* * * * *